(12) United States Patent
Barton et al.

(10) Patent No.: US 7,832,652 B2
(45) Date of Patent: Nov. 16, 2010

(54) HVAC CONTROLLER WITH SIDE REMOVABLE BATTERY HOLDER

(75) Inventors: Eric J. Barton, Eden Prairie, MN (US); Arnie P. Kalla, Maple Grove, MN (US); Paul Meyers, Fishers, IN (US); Cary Leen, Hammond, WI (US)

(73) Assignee: Honeywell International Inc., Morristown, NJ (US)

( * ) Notice: Subject to any disclaimer, the term of this patent is extended or adjusted under 35 U.S.C. 154(b) by 1280 days.

(21) Appl. No.: 10/906,023

(22) Filed: Jan. 31, 2005

(65) Prior Publication Data

US 2006/0172182 A1    Aug. 3, 2006

(51) Int. Cl.
*G05D 23/00* (2006.01)
(52) U.S. Cl. .................. 236/51; 236/94; 236/46 R; 429/96; 429/97; 429/98; 429/99; 429/100; 429/9; 429/123
(58) Field of Classification Search ........... 429/96–100, 429/9, 123; 236/46 R, 51, 94
See application file for complete search history.

(56) References Cited

U.S. PATENT DOCUMENTS

| | | | |
|---|---|---|---|
| 2,789,160 A | 4/1957 | Gage | |
| 4,152,551 A | 5/1979 | Hiller | |
| 4,391,883 A * | 7/1983 | Williamson et al. ........... | 429/97 |
| 4,506,827 A * | 3/1985 | Jamieson et al. .......... | 236/46 R |
| 4,641,370 A | 2/1987 | Oyamada | |
| 4,885,219 A * | 12/1989 | Miller .......................... | 429/99 |
| 4,904,549 A | 2/1990 | Goodwin et al. | |
| 4,959,640 A | 9/1990 | Hall | |
| 4,972,508 A | 11/1990 | King | |
| 4,991,225 A | 2/1991 | Holcomb et al. | |
| 5,193,051 A | 3/1993 | Ma | |
| 5,198,638 A | 3/1993 | Massacesi | |
| 5,244,755 A | 9/1993 | Benoist et al. | |
| 5,280,273 A | 1/1994 | Goldstein | |
| 5,281,954 A | 1/1994 | Harrison et al. | |
| 5,337,215 A * | 8/1994 | Sunderland et al. ......... | 361/726 |
| 5,644,302 A * | 7/1997 | Hana et al. ................... | 340/3.1 |
| 5,804,332 A * | 9/1998 | Shimizu et al. ............. | 429/100 |
| 5,927,599 A * | 7/1999 | Kath ........................... | 236/47 |
| 6,120,932 A * | 9/2000 | Slipy et al. .................... | 429/99 |
| 6,428,924 B1 | 8/2002 | Suganuma et al. | |
| 6,636,018 B2 | 10/2003 | Hirota | |
| 2002/0160255 A1 | 10/2002 | Babcock et al. | |
| 2004/0048638 A1 | 3/2004 | Inomata et al. | |
| 2006/0071087 A1* | 4/2006 | Kates .......................... | 236/1 B |

* cited by examiner

*Primary Examiner*—Frantz F Jules
*Assistant Examiner*—Azim Rahim
(74) *Attorney, Agent, or Firm*—Crompton Seager & Tufte LLC

(57) ABSTRACT

An HVAC controller includes an HVAC controller housing having an aperture and a removable battery tray disposed within the aperture. The removable battery tray includes a pivot point for rotating the battery tray into and out of the aperture.

29 Claims, 6 Drawing Sheets

HVAC CONTROLLER WITH SIDE REMOVABLE BATTERY HOLDER

BACKGROUND

HVAC controllers are used widely in dwellings, buildings, and other controlled spaces. In many cases, the HVAC controllers are mounted on a wall or the like to allow for the measurement and control of the temperature, humidity and/or other environmental parameter within the space. HVAC controllers come in a variety of shapes and with a variety of functions. Advanced HVAC controllers have built in electronics, often with solid state sensors, to sense and control various environmental parameters within a space. The user interface of some electronic HVAC controllers includes software controlled buttons and/or a display.

HVAC controllers often utilize a battery power source as a main power source and/or back-up power source. As a back-up power source, batteries are often used to retain the programmed parameters in the event that the normal power source in the controller circuit is removed or becomes ineffective. In some controllers, both such features are provided by a battery (or several batteries) mounted within the controller. A battery also helps maintain real time in the event of a power interruption.

A battery, however, has certain disadvantages. For example, it requires mounting space, sometimes a significant amount, within the controller. Also, the battery should be replaced periodically. Such replacement is an inconvenience to the user as it often requires dismantling at least a portion of the controller and proper replacement and re-assembly.

SUMMARY

The present invention relates generally to an improved HVAC controller that has a side removable battery tray. In one illustrative embodiment, an HVAC controller includes a controller housing having an aperture and a battery tray removably disposed within the aperture. In some embodiments, the battery tray can include a pivot point in contact with the HVAC controller, and the battery tray can rotate about the pivot point for movement into and out of the aperture in the controller housing.

In some embodiments, an HVAC controller includes an HVAC controller housing having a front surface, a side surface, and a rear surface. The front surface includes a display, the side surface includes a battery tray aperture, and the rear surface includes a battery access aperture. A battery tray is removably disposed within the aperture.

The battery tray can allow a user to simply remove the battery tray from the HVAC controller housing and place or replace a battery in the battery tray. The user can then place the battery and associated battery tray back into the controller housing aperture. The battery tray can be utilized in any type of HVAC controller, as desired.

DETAILED DESCRIPTION

The following description should be read with reference to the drawings, in which like elements in different drawings are numbered in like fashion. The drawings, which are not necessarily to scale, depict selected embodiments and are not intended to limit the scope of the invention. Although examples of construction, dimensions, and materials are illustrated for the various elements, those skilled in the art will recognize that many of the examples provided have suitable alternatives that may be utilized.

Figure 1:
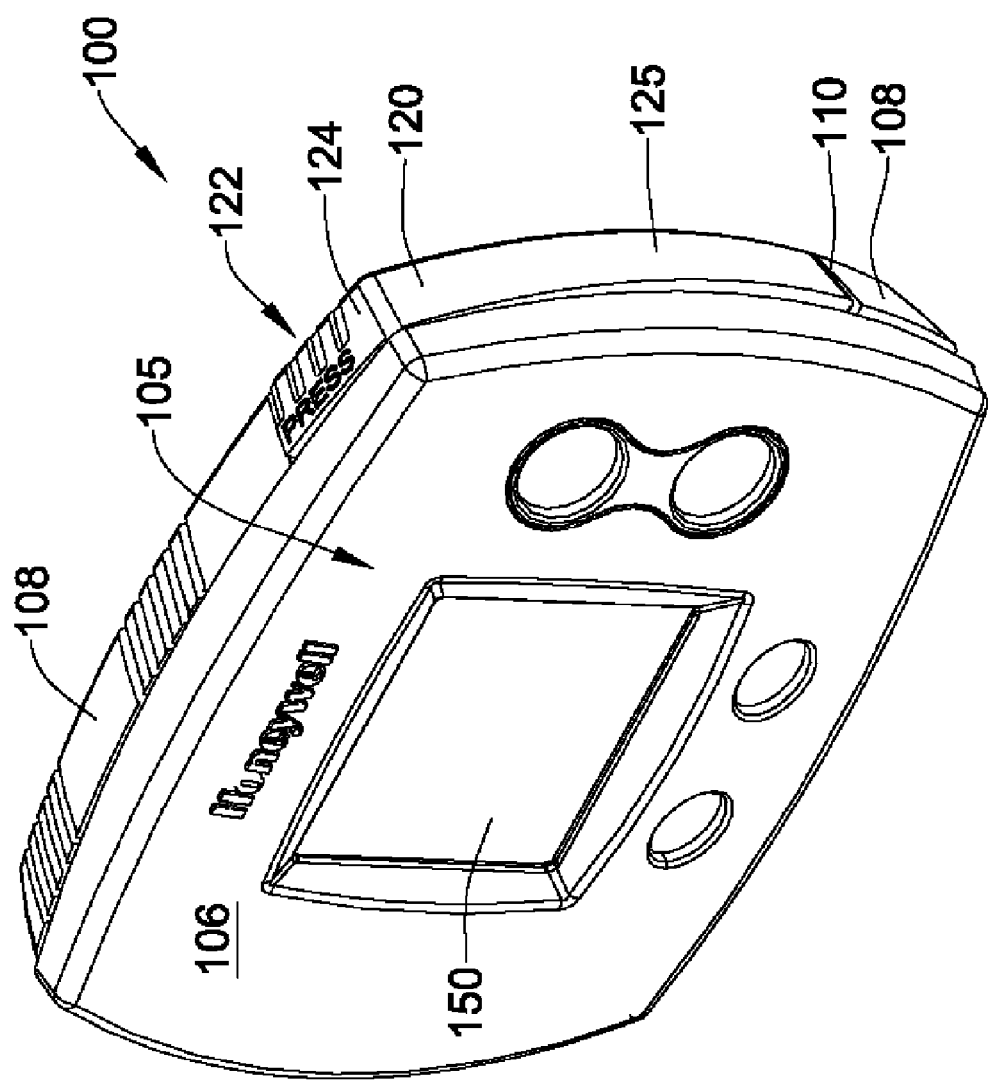
FIG. 1 is a perspective view of an illustrative HVAC controller.

The battery tray described herein is useful in any type of HVAC controller. FIG. 1 shows one embodiment of an HVAC controller 100 incorporating an illustrative battery tray 120. However, it is contemplated that the battery tray 120 can be incorporated into any type, style, or shape of HVAC controller, as desired.

The HVAC controller 100 can include a printed circuit board (not shown) disposed within the HVAC controller 100. One or more wires may be used to interconnect a remote HVAC system (e.g. furnace, boiler, air conditioner, humidifier, etc.) to the printed circuit board. In an illustrative embodiment, the printed circuit board is coupled to the controller, which provides one or more control signals to a remote HVAC system. In some cases, a temperature sensor can be disposed within the HVAC controller 100 and can be electrically coupled to the printed circuit board.

FIG. 1 is a perspective view of an illustrative HVAC controller 100, which in the embodiment shown, can be configured to be mounted on a wall by any suitable fastening means such as, for example, screws, nails, adhesive, etc. The illustrative HVAC controller 100 has a generally rectangular shape, however the HVAC controller 100 can have any shape, as desired. In an illustrative embodiment, the HVAC controller 100 has dimensions of about 4.5 inch by 3.5 inch.

An outer housing 105 forms at least a portion of the outer surface of the HVAC controller 100. The outer housing 105 includes a front surface 106 and a side surface 108. In one embodiment, the outer housing 105 includes four side surfaces 108 extending around a generally rectangular front surface 106. The front surface 106 can include a display 150 such as, for example, a liquid crystal display. In some embodiments, the front 106 surface is generally planar. In one embodiment, the front surface 106 has dimensions of about 4.5 inch by 3.5 inch.

The side surface 108 can include an aperture 110 extending into the HVAC controller 100. The aperture 110 can be sized and configured to receive a battery tray 120 described below. The aperture 110 can extend along at least one side surface 108. In the embodiment shown in FIG. 1, the aperture 110 extends along two side surfaces 108. In some embodiments, the aperture 110 has a width of about 0.5 inch, a height of about 2.5 inches and a depth of about 1.5 inches, but it is contemplated that any suitable dimensions can be used. In one embodiment, the aperture 110 extends along a first side surface 108 a distance about equal to the depth of the aperture, and the aperture 110 extends along a second side surface 108 a distance about equal to the height of the aperture 110. The first side surface 108 and the second side surface 108 can be orthogonal to each other and orthogonal to the front surface 106 as shown in FIG. 1.

Because the battery tray 120 is accessible from the controller housing side 108, the controller 100 does not need to be removed from the mounting surface, for example, wall, to replace the batteries. In addition since the battery tray 120 is disposed on the controller housing side 108, it is not visible from the front of the controller 100.

A battery tray 120 is shown disposed within the aperture 110. The battery tray 120 is sized and configured to mate with the aperture 110. The battery tray 120 can include electrical connections such that a battery disposed within the battery tray 120 comes into electrical communication with the HVAC controller 100 when the battery tray 120 is disposed within the aperture 110. The battery tray 120 can hold one or more batteries. In some embodiments, the battery tray includes an outer surface 125 that forms an integral surface with one, two, or more housing side surface 108. In the illustrative embodiment, the battery tray 120 is removable by a user as further described below.

In some embodiments, gripping means 122 can be disposed on battery tray 120. Gripping means 122 can be any useful element that improves a users grip on the battery tray 120. In one embodiment, the gripping means 122 are one or more raised or recessed elements. In some embodiments, the battery tray 120 includes a latch 124 for securing the battery tray 120 to the controller 100. In one embodiment, the latch 124 is deflected to release the battery tray 120 from the controller 100. The latch 124 can be deflected into the aperture 110 by a user using finger pressure. The battery tray 120 can be rotated away from the controller housing 105 about a pivot point (described below) and removed from the controller 100.

Figure 2:
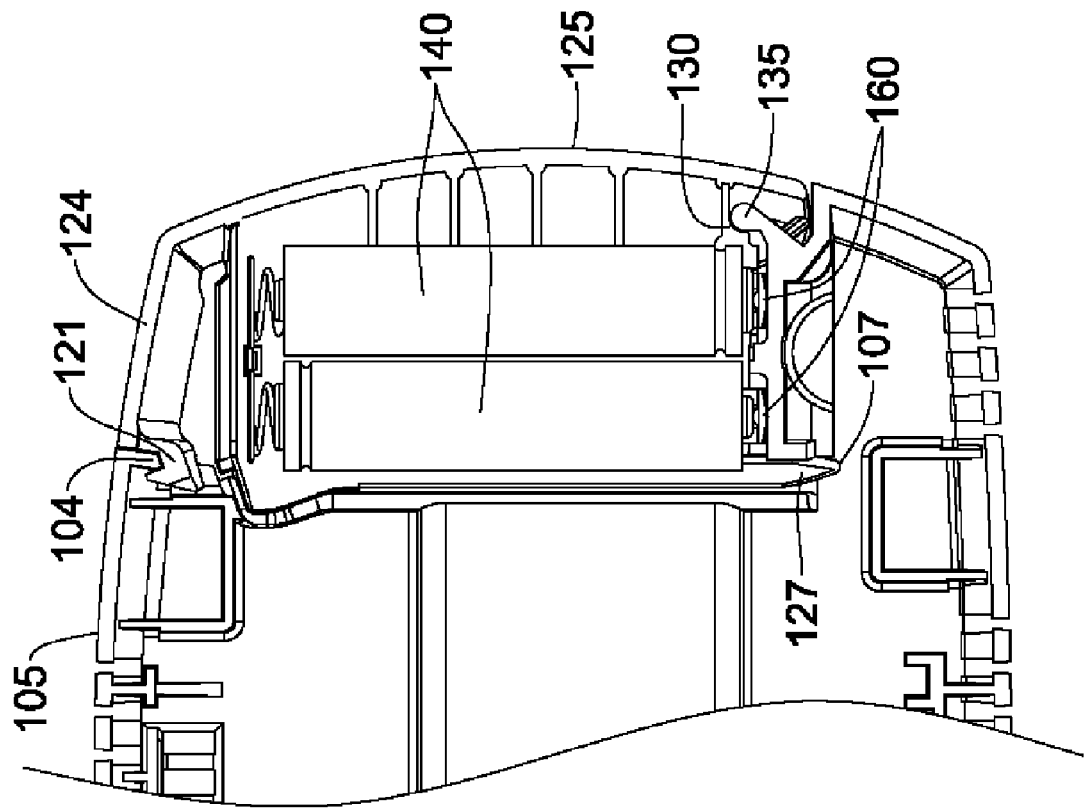
FIG. 2 is a partial cross-sectional schematic view of the removable battery tray disposed in the HVAC controller of FIG. 1.

FIG. 2 is a partial cross-sectional schematic view of the removable battery tray 120 disposed in the HVAC controller 100 of FIG. 1. For reference, FIG. 2 illustrates a rear elevation view of the HVAC controller 100 and FIG. 1 illustrates a front elevation view of the HVAC controller 100. The battery tray 120 is shown secured to the controller housing 105.

In the embodiment shown, the battery tray 120 includes a latch 124 that is coupled to a latch mating member 104 disposed on the controller housing 105. In this embodiment, the latch 124 is deflectable toward the battery tray 120 via finger pressure applied to the gripping means 122 located along the latch 124 body. In some embodiments, the latch 124 includes a free end 121 sized and configured to mate with the housing latch mating member 104. The latch free end 121 can be any shape useful for coupling with the housing latch mating member 104 such as, for example, a hook shape. In another embodiment (not shown), the housing latch mating member 104 is deflectable toward the interior of the controller 100 via finger pressure and releasing the latch 124 to allow the battery tray 120 to rotate out of the aperture 110. In some embodiments, the battery tray 120 is secured to the controller 100 by frictional engagement elements.

Alkaline batteries 140 are shown disposed within the battery tray 120. The battery tray 120 includes a pivot point 130. The housing 105 includes a pivot point mating member 135. The pivot point 130 is disposed adjacent the pivot point mating member 135 and the pivot point 130 allows the battery tray 120 to rotate about the pivot point mating member 135. Rotation of the battery tray 120 about the pivot point mating member 135 allows the battery tray to move away from the controller housing 105 and the aperture 110. Any amount of rotation can allow the battery tray to be removed from the aperture 110. In some embodiments, the battery tray 120 is rotated from 5 to 90 degrees, or from 10 to 90 degrees, or from 15 to 90 degrees, or from 20 to 90 degrees before the battery tray 120 is able to be removed from the aperture 110. The battery tray 120 can be lifted out and away from the controller 100 at any point of the rotation. Likewise, the battery tray pivot point 130 can engage the controller housing pivot point mating member 135 such that the battery tray 120 is at any useable angle relative to the controller 100 and then rotated into a correct position for secure engagement with the controller housing 105.

When the battery tray 120 is disposed within the aperture 110, electrical contacts 160 make electrical connection with the batteries 140. The electrical contacts 160 can be in electrical connection with the controller circuit board and/or controller electronics. In some embodiments, the electrical contacts 160 are resilient and placing the battery tray 120 into the aperture 110 deflects the electrical contacts 160 while in electrical connection with the batteries 140. In some cases, the electrical contacts 160 can secure the battery tray 120 into the aperture 110. In some embodiments, the electrical contacts 160 are secured to the controller housing 105. In some embodiments, the batteries 140 rotate into the aperture 110 and then make contact with the electrical contacts 160 as it is secured into the aperture 110. The latch 124 and/or the latch mating member 104 can be eliminated if the electrical contacts 160 provide for securing the battery tray 120 to the controller housing 105.

Figure 4:
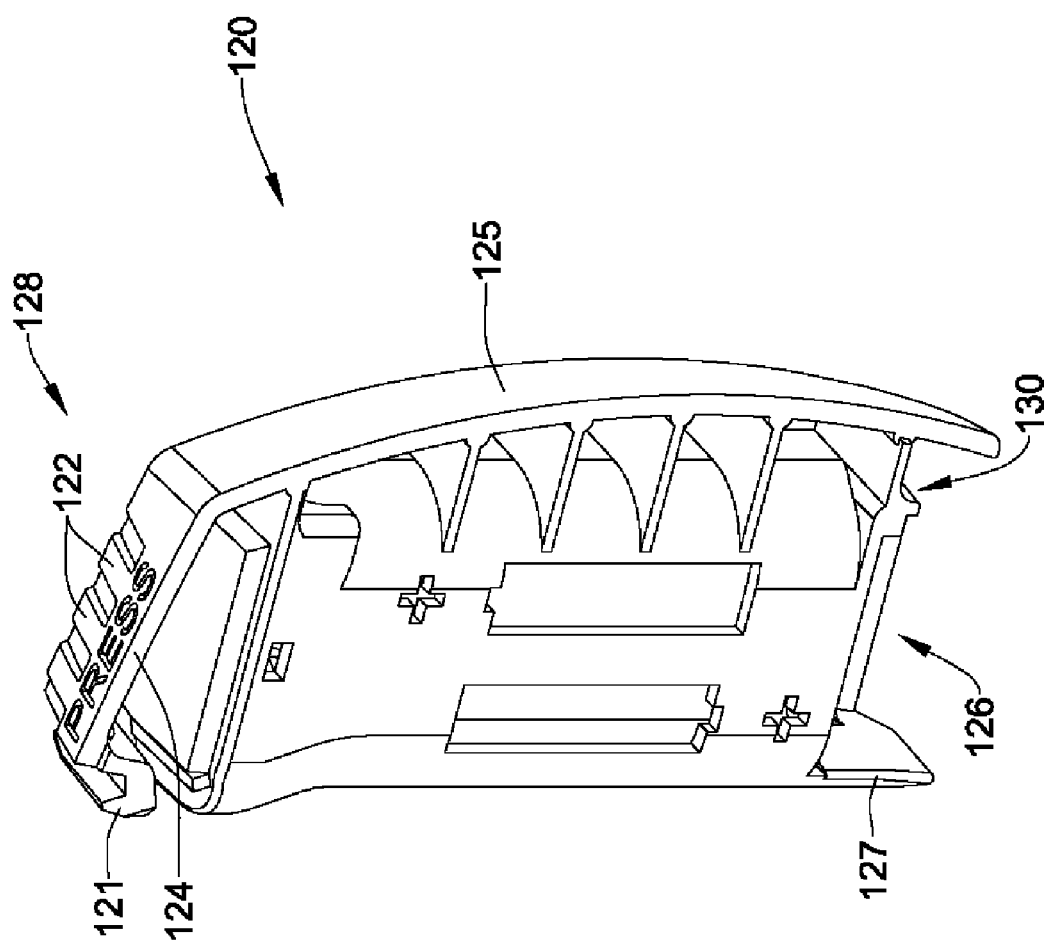
FIG. 4 is a perspective view of an illustrative battery tray.

In some embodiments, the battery tray 120 includes pivot point on a first side of the battery tray 120 and the latch 124 on a second opposing side of the battery tray 120 as shown in FIG. 2. A shoulder 127 can be disposed on the battery tray 120. In some embodiments, the shoulder 127 is disposed adjacent the pivot point 130 on the same first side 126 of the battery tray 120 as shown in FIGS. 2 and 4. The controller housing 105 can include a shoulder mating slot 107 sized and configured to mate with the battery tray 120 shoulder 127. In some embodiments, engagement of the shoulder 127 into the shoulder mating slot 107 can assist in aligning the battery tray 120 into the aperture 110 or can assist in securing the battery tray 120 into the aperture 110.

Figure 3:
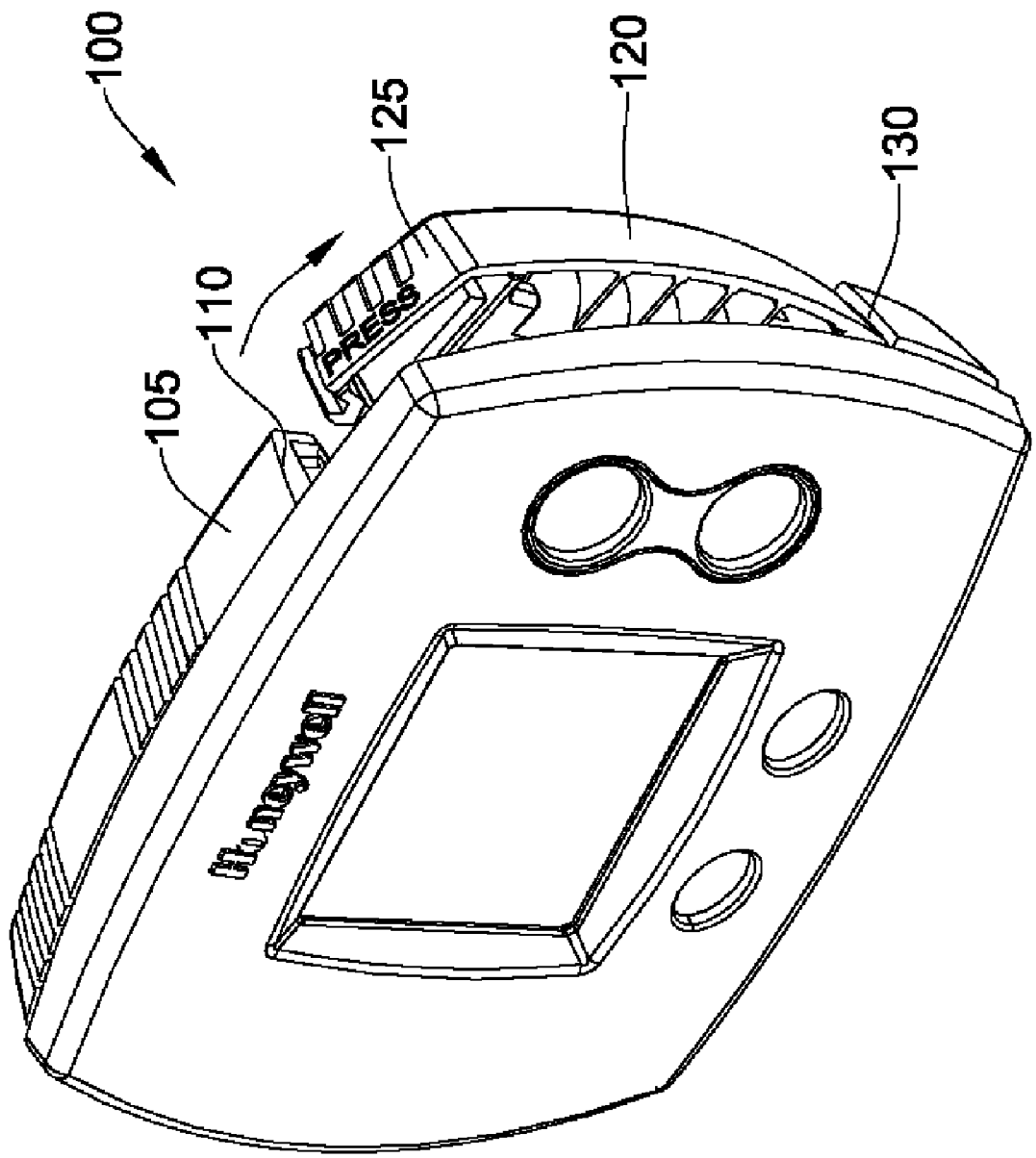
FIG. 3 is a perspective view of the illustrative HVAC controller of FIG. 1 with the battery tray being removed.

FIG. 3 is a perspective view of the illustrative HVAC controller 100 with the battery tray 120 being removed from the aperture 110. In this illustrative embodiment, the battery tray 120 is disposed within the housing aperture 110 and can be partially or fully removed from the housing aperture 110. A user can grasp the battery tray 120 and fully or partially remove the battery tray 120 from the housing aperture 110 by rotating the battery tray 120 away from the housing 105 about the battery tray pivot point 130 and place a battery in the battery tray 120 or replace an existing battery in the battery tray 120. The battery tray 120 can then be re-positioned within the housing aperture 110 by contacting the battery tray pivot point 130 with the housing pivot point mating member 135 (shown in FIG. 2) and rotated toward the housing 105 about the pivot point 130 until the battery tray 120 is fully engaged with the housing aperture 110.

In some embodiments, the tray 120 includes electronics (e.g., electronics, memory and/or software to provide additional/enhanced functionality to the HVAC controller). In some embodiments, the tray 120 includes one or more batteries and electronics or the tray 120 includes electronics but does not include batteries.

FIG. 4 is a perspective view of an illustrative battery tray 120 fully removed from the housing aperture 110. In this embodiment the battery tray 120 includes a latch 124 that is deflectable toward the battery tray 120 via finger pressure applied to the gripping means 122 located along the latch 124 body. In the embodiment shown, the latch 124 includes a free end 121 having a hook shape for secure engagement with the controller 100. The battery tray 120 includes a pivot point 130. The pivot point 130 allows the battery tray 120 to rotate into and away from the controller 100. The battery tray 120 shown includes a pivot point on a first side of the battery tray 120 and the latch 124 on a second opposing side of the battery tray 120. A shoulder 127 is shown disposed on the battery tray 120. The shoulder 127 can be disposed adjacent the pivot point 130 on the same second opposing side of the battery tray 120. The battery tray 120 includes an outer surface 125 disposed between the pivot point 130 and the latch 124. The outer surface 125 can be disposed between the first side 126 and opposing second side 128 of the battery tray 120. The outer surface 125 is shown having a curved or non-planar surface corresponding to the curve of the controller side 108 surface at the location of the housing aperture 110. Thus, when the battery tray 120 in secured within the HVAC controller 100, the battery tray 120 outer surface 125 forms an integral surface with the controller housing 105. The above battery tray 120 elements can have any useful size. In some embodiments, the battery tray 120 has an overall height in a range from about 2 to 3 inches, an overall width in a range of about 1 to 1.5 inches, and an overall depth in a range from about 0.25 to 1 inch.

Figure 5:
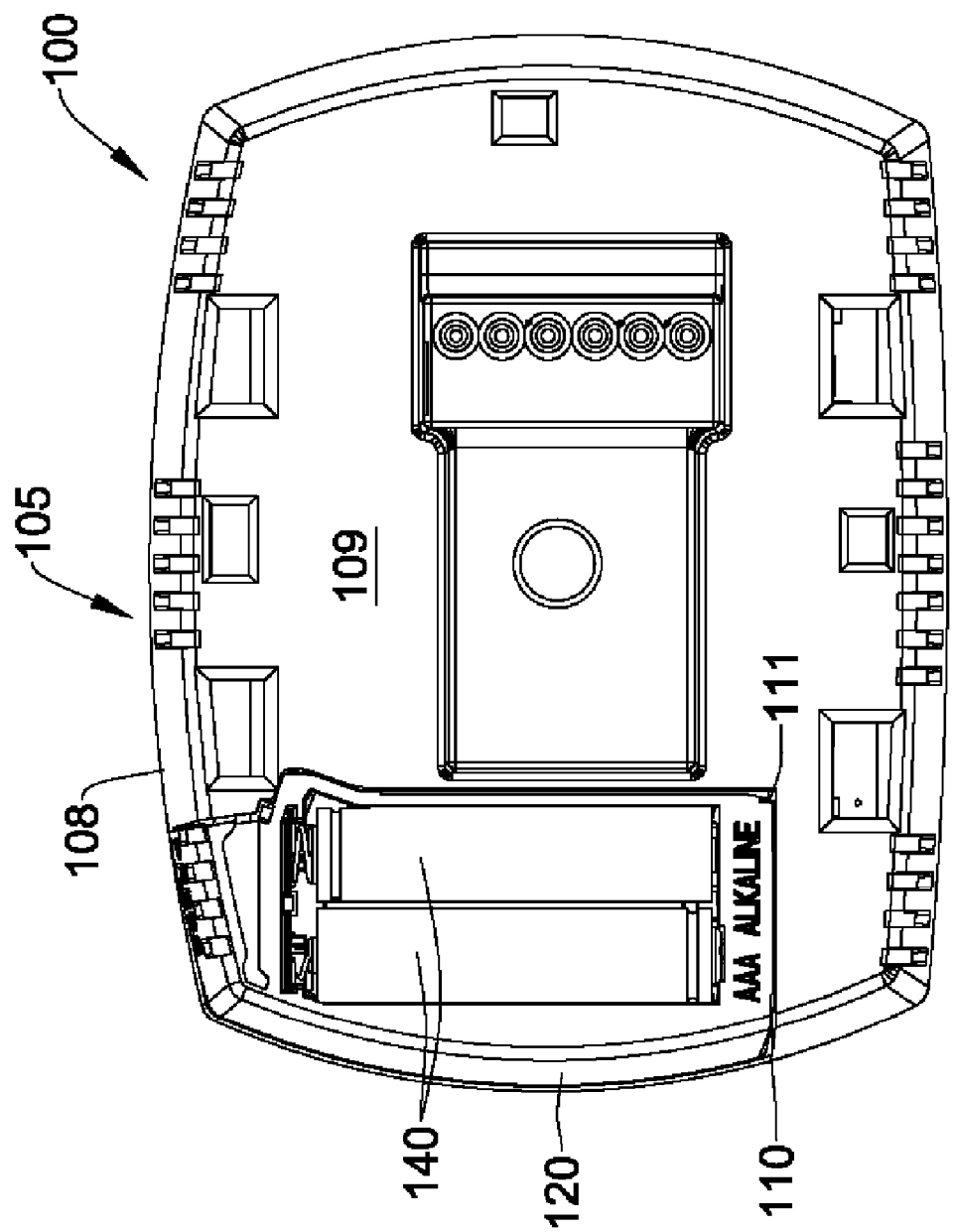
FIG. 5 is a rear elevation view of an illustrative HVAC controller of FIG. 1.

FIG. 5 is a rear elevation view of an illustrative HVAC controller 100 of FIG. 1. In some embodiments, an HVAC controller 100 includes an HVAC controller housing 105 having a front surface 106, a side surface 108, and a rear surface 109. The front surface 106 includes a display 150 (see FIG. 1), the side surface 108 includes a battery tray aperture 110, and the rear surface 109 includes a battery access aperture 111. A battery tray 120 is removably disposed within the aperture 110. The controller 100 can be mounted onto a mounting surface (such as, for example, a wall surface) such that the rear surface 109 is disposed adjacent to the mounting surface. The battery tray 120 can be secured within the battery tray aperture 110 and the one or more batteries 140 can be placed into or removed from the battery tray 120 via the battery access aperture 111. The battery aperture 111 can be sized and configured to allow a battery 140 to be placed into or removed from the battery tray 120 while the battery tray 120 is secured within the battery tray aperture 110. The battery access aperture 111 is shown sized to correspond to the size of the battery tray 120, however the battery access aperture 111 can be any useful size that can allow for removal and/or replacement of the batteries 140 while the battery tray 120 is secured to the controller 100.

Figure 6:
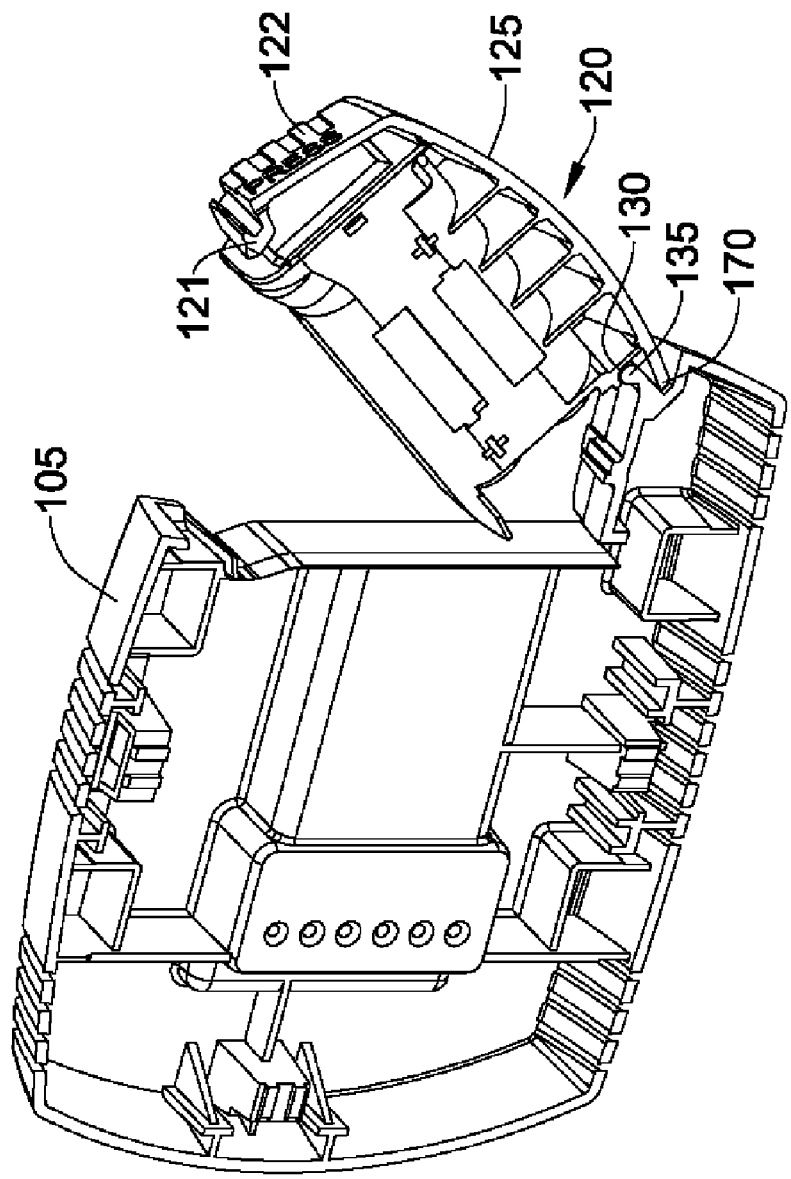
FIG. 6 is a perspective cross-sectional view of the illustrative HVAC controller of FIG. 1 with the battery tray being removed.

FIG. 6 is a perspective cross-sectional view of the illustrative HVAC controller of FIG. 1 with the battery tray 120 being removed. In the illustrated embodiment, the battery tray 120 is rotated away from the controller housing 105 until a bottom edge 170 of the battery tray outer surface 125 contacts a portion of the pivot point mating element 135. Once the bottom edge 170 of the battery tray outer surface 125 contacts a portion of the pivot point mating element 135, the battery tray 120 can be suspended at that point of the rotation. Thus, the battery tray pivot point 130 contacts the pivot point mating element 135 and the bottom edge 170 of the battery tray outer surface 125 contacts the pivot point mating element 135 at the same time and allows the battery tray 120 to be suspended on the controller housing 105. Once the battery tray 120 is suspended, or at any point in the rotation prior to be suspended, the battery tray 120 can be lifted away from the controller housing 105.

Having thus described the several embodiments of the present invention, those of skill in the art will readily appreciate that other embodiments may be made and used which fall within the scope of the claims attached hereto. Numerous advantages of the invention covered by this document have been set forth in the foregoing description. It will be understood that this disclosure is, in many respects, only illustrative. Changes may be made in details, particularly in matters of shape, size and arrangement of parts without exceeding the scope of the invention.

What is claimed is:

1. An HVAC controller having an HVAC controller housing with a front, a back, and a side extending between the front and back, the HVAC controller configured to be mounted to a wall with the back of the HVAC controller housing positioned adjacent to the wall, the HVAC controller comprising:
    an aperture defined in the side of the HVAC controller housing and extending to the back of the HVAC controller housing;
    a pivotable battery tray disposed within the aperture, the battery tray being pivotable about a pivot axis between a closed position and an open position while the HVAC controller is mounted to the wall, and can be suspended on the HVAC controller housing in the open position, wherein at least a portion of the battery tray forms at least part of the side of the HVAC controller housing and at least part of the back of the HVAC controller housing when the battery tray is in the closed position; and
    wherein once the pivotable battery tray is pivoted out of the closed position, the pivotable battery tray is free to be lifted away from the pivot axis and completely removed from the aperture of the HVAC controller housing.

2. An HVAC controller according to claim 1 further comprising a battery disposed within the pivotable battery tray such that the battery moves and pivots out with the pivotable battery tray as the pivotable battery tray is pivoted out from the closed position to the open position.

3. An HVAC controller according to claim 1 wherein the battery tray is configured to house an elongated battery that extends lengthwise along a battery axis, wherein when the battery tray houses the elongated battery, the battery axis of the elongated battery extends at least substantially perpendicular to the pivot axis.

4. An HVAC controller according to claim 1 wherein the pivotable battery tray comprises gripping means.

5. An HVAC controller according to claim 1 wherein the HVAC controller comprises a pivot mating member arranged and configured to mate with a pivotable battery tray pivot member.

6. An HVAC controller according to claim 1 wherein the pivotable battery tray comprises a latch member.

7. An HVAC controller according to claim 6 wherein the HVAC controller comprises a latch mating member arranged and configured to mate with the battery tray latch member.

8. An HVAC controller according to claim 6 wherein the battery tray latch member further comprises gripping means.

9. An HVAC controller according to claim 2 wherein the battery is selectively electrically coupled to a circuit board disposed in the HVAC controller housing.

10. An HVAC controller according to claim 1 wherein the HVAC controller is a thermostat.

11. An HVAC controller according to claim 6 wherein the pivot axis is disposed adjacent a first side of the pivotable battery tray, and the latch member is disposed adjacent on an opposing second side of the pivotable battery tray.

12. An HVAC controller according to claim 11 wherein the battery tray further comprises a shoulder disposed adjacent the first side of the pivotable battery tray, and the HVAC controller housing includes a shoulder mating slot sized and configured to mate with the shoulder of the pivotable battery tray.

13. A method of replacing a battery in an HVAC controller having an HVAC controller housing with a front, a back, and a side extending between the front and back, the HVAC controller configured to be mounted to a wall with the back of the HVAC controller housing positioned adjacent to the wall, wherein the HVAC controller has a battery tray pivotably disposed within the aperture, wherein at least a portion of the battery tray forms an outer surface of the HVAC controller housing when the battery tray is in a closed position and the battery tray forms at least part of the back of the HVAC controller when the battery tray is in a closed position, the method comprising steps of:

with the battery tray in the closed position:
removing a first battery from the battery tray from the back of the HVAC controller housing; and
placing a second battery in the battery tray from the back of the HVAC controller housing.

14. A method according to claim 13 further comprising:
removing the battery tray from the aperture by initially rotating the battery tray about a pivot axis from the closed position, and once rotated out of the closed position, lifting the battery tray away from the pivot axis and completely removing the battery tray from the aperture of the HVAC controller housing.

15. A method according to claim 14 wherein the battery tray is configured to hold the battery such that the battery moves with the battery tray as the battery tray rotates from the closed position towards an open position.

16. A method according to claim 14 wherein the removing the battery tray step comprises initially rotating the battery tray by at least 10 to 90 degrees about the pivot axis before lifting the battery tray away from the pivot axis and completely removing the battery tray from the aperture of the HVAC controller housing.

17. An HVAC controller comprising:
an HVAC controller housing having a front, a back and a side extending between the front and the back;
the side of the HVAC controller housing defining a top side, a bottom side, a left side and a right side, with two upper corners extending between the top side and the left and right sides, and two bottom corners extending between the bottom side and the left and right sides, the front surface of the HVAC controller comprising a display;
the HVAC controller housing defining an aperture that extends along and through one of the right and left sides, up through part of the top side including the upper corner that extends between the one of the right and left sides and the top side, and through the back of the HVAC controller housing; and
the HVAC controller housing further having a battery tray pivotably disposed within the aperture, wherein at least a portion of the battery tray forms an outer surface that is congruous with the one of the left and right sides and top side of the HVAC controller housing, and the battery tray forms at least part of the back of the HVAC controller housing when the battery tray is in a closed position, the battery tray configured to at least initially rotate out of the aperture about a pivot axis.

18. An HVAC controller according to claim 17, wherein the battery tray is configured to house an elongated battery that extends lengthwise along a battery axis, wherein when the battery tray houses the elongated battery, the battery axis of the elongated battery extends at least substantially perpendicular to the pivot axis.

19. An HVAC controller according to claim 17 wherein the battery tray comprises a latch member.

20. An HVAC controller according to claim 19 wherein the battery tray pivot axis is disposed adjacent the one of the left and right sides of the HVAC controller housing, and the latch member is disposed adjacent the top side of the HVAC controller housing.

21. An HVAC controller according to claim 17 wherein the display is a liquid crystal display.

22. An HVAC controller comprising:
an HVAC controller housing having a front surface, a side surface and a rear surface, the side surface comprising a battery tray aperture extending through the side surface, and the rear surface comprising a battery access aperture formed through the rear surface;
a battery tray removably disposed within the battery tray aperture, the battery tray configured to be moved between a closed position and an open position, wherein in the closed position the battery tray substantially fills the aperture in the side surface of the HVAC controller housing; and
wherein the battery access aperture in the rear surface of the HVAC controller housing provides access to one or more batteries disposed in the battery tray when the battery tray is in the closed position.

23. An HVAC controller according to claim 22 wherein the front surface comprises a display and the display is a liquid crystal display.

24. An HVAC controller according to claim 22 wherein the battery access aperture is sized for insertion and removal of the one or more batteries into and out of the battery tray while the battery tray is in the closed position.

25. An HVAC controller according to claim 22 wherein the battery tray moves about a pivot axis for at least initially rotating the battery tray out of the battery tray aperture.

26. An HVAC controller according to claim 22 wherein the battery access aperture is sized to correspond with the battery tray.

27. An HVAC controller according to claim 22 wherein the battery access aperture and the battery tray aperture form a common aperture extending through the HVAC controller housing.

28. An HVAC controller according to claim 22 wherein the battery access aperture and the battery tray aperture are separate apertures extending through the HVAC controller housing.

29. An HVAC controller according to claim 1, wherein the pivot axis is substantially perpendicular to the back of the HVAC controller housing.

* * * * *